United States Patent [19]

Johnson et al.

[11] Patent Number: 4,521,260

[45] Date of Patent: Jun. 4, 1985

[54] DETONATION-TRANSFER ENERGETIC COMPOSITION

[75] Inventors: Nancy C. Johnson, Waldorf; Carl Gotzmer, Jr., Accokeek, both of Md.

[73] Assignee: The United States of America as represented by the Secretary of the Navy, Washington, D.C.

[21] Appl. No.: 665,335

[22] Filed: Oct. 26, 1984

[51] Int. Cl.$^3$ .............................................. C06B 45/10
[52] U.S. Cl. .............................. 149/19.91; 149/19.9; 149/19.92; 149/93
[58] Field of Search .......................... 149/19.9–19.92, 149/93

[56] References Cited

U.S. PATENT DOCUMENTS

| | | | |
|---|---|---|---|
| 2,999,743 | 9/1961 | Breza et al. | 149/19.9 |
| 3,158,991 | 12/1964 | D'Alelia | 149/19.9 |
| 3,203,169 | 8/1965 | D'Alelio . | |
| 3,203,170 | 8/1965 | D'Alelio . | |
| 3,214,306 | 10/1965 | Colichman et al. . | |
| 3,338,764 | 8/1967 | Evans | 149/19.9 |
| 3,657,027 | 4/1972 | Horsey et al. . | |
| 3,702,354 | 11/1972 | Diebold | 149/19.9 |
| 3,973,499 | 8/1976 | Anderson et al. . | |
| 4,343,664 | 8/1982 | Iyer | 149/19.92 |

OTHER PUBLICATIONS

Johnson et al., J. of Energetic Materials, 1, pp. 83–93 (1983).
Chemical Week, pp. 64–67 (Oct. 14, 1981).

*Primary Examiner*—Edward A. Miller
*Attorney, Agent, or Firm*—Robert F. Beers; Thomas E. McDonnell

[57] ABSTRACT

An energetic composition useful in transferring detonation through thin channels in a logic pattern comprises a binder comprising vinyl-terminated polybutadiene-acrylonitrile copolymer crosslinked with a monofunctional unsaturated ester monomer in an amount from about 50 to about 90 percent of the binder weight and a plasticizer selected from the group consisting of dioctyl phthalate, maleate and adipate, isodecyl pelargonate, dibutyl phthalate and maleate in an amount from about 10 to 50 percent of the binder weight, and pentaerythritol tetranitrate in amount from about 76 to 84 percent of the total composition weight. The composition is cured with ionizing radiation in a dose from about $0.6 \times 10^6$ to 1.2 to $10^6$ rads.

17 Claims, No Drawings

DETONATION-TRANSFER ENERGETIC COMPOSITION

BACKGROUND OF THE INVENTION

The invention pertains generally to energetic materials and in particular to a material capable of propagating detonation along a small channel.

The requirements for a detonation-transfer composition are great since detonation-transfer compositions are used in a pattern of thin channels that constitutes the detonation sequence or logic. The composition must be capable of being injection molded into a small channel, e.g., 0.2 to 1.5 mm in diameter, that curves and can have turns of 90° or more. It is critical that all channels are continuously filled, thereby requiring the composition to initially flow into all open spaces in the pattern and resist cracking during cure, storage, and use. In addition to these rigorous physical properties, the composition must have equally rigorous explosive properties. The critical diameter, which is the smallest diameter of material that permits propagation of detonation, can not exceed 1.5 mm. The detonation velocity cannot be less than about 6500 meters/sec. Of course, the material must be relatively insensitive. If the ordnance having a detonation logic is to be stored, it is of great importance to have a stable detonation-transfer material. Unfortunately, materials that have small critical diameters and high detonation velocities generally have a lower sensitivity and stability.

Presently, the only DoD-certified detonation-transfer energetic composition comprises about 80 weight percent of pentaerythritol tetranitrate and the remainder of vinyl-terminated polydimethyl siloxane crosslinked with hydrogen-terminated polymethyl siloxane. The composition requires a certain platinum catalyst that causes several problems. Mix reproducibility is poor because the catalyst can be poisoned and can be easily misused. The mixed uncured explosive has a shelf-life at ambient temperature of only 24 hours, thus necessitating cold storage at a temperature from −29° to −51° C. Even at those temperatures, the shelf life is only eight months. Further problems are experienced with the physical strength of the cured material. These problems are due, in part, to the catalyst or improper storage and to the physical properties of the cured material. The net result of these problems is a very restricted use of energetic logic devices, despite a great need for these devices.

A possible energetic composition for transferring detonation is the composition that comprises vinyl-terminated polybutadiene-acrylonitrile copolymer crosslinked with an unsaturated ester and styrene and a cyclopolymethylene-polynitramine energetic filler. Tests have shown that the critical diameter and the detonation velocity of this composition are unsatisfactory. Even if the loading of this energetic filler were increased above 80 weight percent, the composition would still have a critical diameter and detonation velocity that would be still unsatisfactory. A different energetic filler is needed, but as was stated previously, energetic fillers giving a higher detonation velocity and a smaller critical diameter are also more sensitive, less stable, and decompose more easily when radiated. Another problem associated with the above composition is the increased difficulty in processing the composition because of the polymer. The particular crosslinked copolymer does not process as easily as the siloxane binder of the existing detonation-transfer composition. Processing in this discussion includes both compounding the composition and injection-molding the composition into a detonation-transfer link, i.e., a very small channel.

SUMMARY OF THE INVENTION

It is, therefore, an object of this invention to cure injection-moldable energetic compositions without catalysts.

Another object of this invention is to provide an energetic composition with an indefinite pot-life and shelf-life.

A further object of this invention is to substantially increase the strength and reliability of detonation-transfer energetic compositions.

These and other objects are achieved by a detonation-transfer energetic composition that comprises a binder system of a vinyl-terminated polybutadiene-acrylonitrile copolymer crosslinked with a monofunctional unsaturated ester monomer in an amount less than that of the copolymer and a long-chain-ester plasticizer in amount from 20 to 50 percent of the total binder weight, and superfine pentaerythritol tetranitrate in amount of from at least 79 weight percent to the maximum amount that can be processed and is cured with ionizing radiation.

DETAILED DESCRIPTION OF THE INVENTION

The energetic filler of the present detonation-transfer composition is pentaerythritol tetranitrate (PETN). It has been determined that the critical diameter and the detonation velocity of a composition with this energetic filler and the radiation-curable binder system of this invention are comparable to the presently used composition that was described previously. More importantly, it has been determined that PETN does not significantly decompose under ionizing radiation if it is not too high and too long.

In order for the resulting composition to be injection moldable, the average particle size must be superfine, i.e., from about one micron to about four microns and preferably from two to three microns. If the average particle size is smaller than one micron, serious processing problems exist. In fact processing is difficult with particle sizes under four microns. A particle size in excess of four microns has poor injection molding capabilities.

The amount of pentaerythritol tetranitrate is from about 76 to about 84 percent and preferably from 79 to 81 percent of the total weight of the composition. A loading of less than 76 weight percent would not transfer detonation and in excess of 84 weight percent cannot be processed with present technology.

The binder system of the present composition comprises a polymer, a plasticizer and usually a few additional ingredients, e.g., an antioxidant or a wetting agent. The requirements for the binder system are that it doesn't significantly diminish the energetic properties of the composition, it can be radiation-cured at dosages which do not degrade the energetic filler, and it has excellent physical properties, e.g., strength, flow characteristics, and good binding for the filler.

The polymer is a vinyl-terminated polybutadiene-acrylonitrile copolymer represented by the formula:

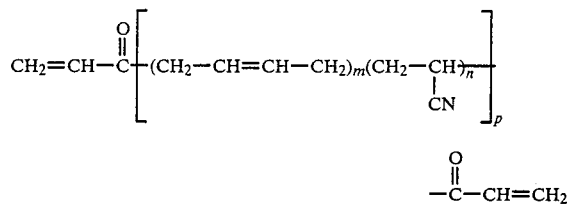

$$-\overset{\overset{\text{O}}{\|}}{\text{C}}-\text{CH}=\text{CH}_2$$

wherein m, n, and p have values such that the acrylonitrile content is from about 5 to about 20 percent, the vinyl equivalent weight is from about 1000 to about 1600, and the average molecular weight is from about 2500 to about 5000. Preferably the acrylonitrile content is from 10 to 15 percent, the vinyl equivalent weight is from 1200 to 1400, and the average molecular weight is from 3000 to 4000. The amount of copolymer, based on total binder weight, is from about 25 to about 60 percent and preferably from 30 to 45 percent.

The copolymer is crosslinked with a monofunctional unsaturated ester of low viscosity and with a boiling point above 65° C. at atmospheric pressure. The preferred crosslinking monomers are acrylates and methacrylates and in particular alkyl acrylates or methacrylates or hydroxyalkyl methacrylates having an alkyl group with one to four carbon atoms. Examples of these monomers are methyl acrylate or methacrylate, ethyl acrylate or methacrylate, and propyl acrylate or methacrylate. The most preferred monomers are hydroxyethyl and hydroxypropyl methacrylate (HPMA). The amount of the ester is less than that of the copolymer and usually is at least about 5 weight percent less. The cross-linking monomer constitutes from about 25 to about 45 weight percent of the total binder weight. The preferred amount is from 25 to 35 weight percent of the total binder weight.

The binder system of this invention provides an effective detonation-transfer composition because of the greatly increased amount of plasticizer and the selection of plasticizer. The previously tested compositions with a polymer similar to the polymer used in this binder system did not satisfactorily compound or flow, even with lower loadings. Surprisingly the amount of plasticizer is greatly increased without any detrimental decrease in the physical strength of the binder system. One possible reason for this unexpected result is that radiation produces free radicals which cause binding between the organic polymeric channel and the binder.

The plasticizers are long-chain esters selected from the group consisting of dioctyl phthalate, maleate, and adipate, isodecyl pelargonate, dibutyl phthalate and maleate and mixtures thereof. The preferred plasticizer is dioctyl maleate and adipate. The amount of plasticizer is from about 20 to about 50 weight percent of the total binder weight, but preferably is from 25 to 40 weight percent.

Additional ingredients can be added to the composition. An anti-oxidant agent can be added so long as the agent is not also a chain stopper. The preferred antioxidants are hindered phenols such as thiodiethylene bis-(3,5-di-tert-butyl-4-hydroxy) hydrocinnamate and alkyl arylated bisphenolic phosphates having an alkyl group with 1 to 10 carbon atoms and bulky alkylated phenols having secondary or tertiary alkyl groups with 3 to 10 carbon atoms, e.g., tertiary butyl hydroquinone and tert-butyl pyrocatechol. The anti-oxidant is added in an amount up to about one weight percent, but preferably at a weight percent from 0.4 to 0.5. To further improve processing and strength of the cured material, a wetting agent is added in an amount up to about one weight percent. The preferred wetting agent is lecithin.

The extremely fine particle size and the nature of the binder polymer cause serious problems with compounding. Typically a high-shear mixer is sufficient to compound energetic compositions. With the present composition, it is necessary to employ a two-stage mixing with two types of mixers. Further, the energetic filler needs to be added in a certain manner.

The organic materials, along with about one-fourth of the amount of pentaerythritol tetranitrate, are added to a high-shear mixer. Mixing is continued until a uniform mixture is obtained. Another fourth of pentaerythritol tetranitrate is added to the mixer and mixing is continued until a uniform mixture is obtained. The remaining two fourths are similarly added and mixed.

The resulting mixture does not have the needed putty-like texture. The mixture is transferred to a three-roll pigment dispersion mill where it is mixed to the required putty-like texture at 25° C.

The ionizing radiation used to cure the energetic composition is either x-ray or electron radiation. Any source can be used to produce the radiation. For example, any of the commercially available electron linear accelerators with sufficient power can be used to produce the electron radiation. Similarly, industrial x-ray units could be used if the composition is to be cured with x-ray radiation. The rate of irradiating the composition is not a factor. However, on account of the sensitivity of the energetic filler and the reactivity (non-reactivity) of the polymeric binder, the total radiation must be kept within a narrow range. The total radiation dose is from about $0.5 \times 10^6$ to about $1.3 \times 10^6$ rads, preferably from $0.6 \times 10^6$ to $1.0 \times 10^6$ rads. It is significant to note that the energetic filler, even though more sensitive and unstable than cyclopolymethylene polynitramine, e.g., HMX or RDX, does not appreciably decompose to cause voids in the cured material. Due to the extremely small size of the channels, almost any void would cause the detonation-logic device to fail.

Having described the invention in general, the following examples are given as specific illustrations thereof. It is understood that the examples are given by way of demonstration and are not intended to limit this disclosure or the claims to follow in any manner.

I. Radiation Damage to PETN

A pure sample of solid pentaerythritol tetranitrate was irradiated with $1 \times 10^6$ rads from a General Electric 2000 KVP x-ray unit. Decomposition was tested by measurements of differential scanning calorimetry to determine the melting temperature (TM) and the decomposition temperature (TD) and a high performance liquid chromatography (HPLC) and x-ray photoelectron spectroscopy (XPS) to determine the presence of decomposition products and/or changes in the PETN molecular structure. Stability was also tested by vacuum thermal stability (VTS). The acceptable limit for VTS is 2 ml/gm/48 hrs. The results are compared to those of a pure sample of PETN that was not radiated in TABLE I.

TABLE I

| TEST METHOD | NONRAD PETN | IRRAD PETN |
|---|---|---|
| DSC | | |

TABLE I-continued

| TEST METHOD | NONRAD PETN | IRRAD PETN |
|---|---|---|
| $T_M$, °C. | 141 | 141 |
| $T_D$, °C. | 182 | 181 |
| VTS (100° C.), ML/G/48 HRS | 0.34 | 0.70 |
| HPLC | | NO DECOMPOSITION |
| XPS, N 1s SPECTRUM | | NO DECOMPOSITION |

II. Physical Properties of Binder System

One hundred gram samples of the binder system were prepared by admixing the ingredients together in a high-shear Perkins-Baker mixer for approximately 30 minutes at about 23° C. The viscosity was tested at 27° C. The samples were cast into acrylic (Lucite) gumstock molds sealed with polyethylene lids and were irradiated. The cavity thickness of the mold was 0.16 cm.

Micro-dogbones (0.048 cm² cross section) were cut from the cured material and the physical properties were tested at 25° C. The results are summarized in Table II. In Table II, the following abbreviations are used: VTBN for vinyl-terminated polybutadiene-acrylonitrile copolymer, HPMA for hydroxypropyl methacrylate, DOM for dioctyl maleate, IDP for isodecyl pelargonate, and VCN for acrylonitrile content, and IRG for Irganox 1035 [thiodiethylene bis-(3,5-di-tert-butyl-4-hydroxy) hydrocinnamate].

TABLE II

| | BINDER # | | | | |
|---|---|---|---|---|---|
| FORMULATION, WT. % | 1 | 2 | 3 | 4 | 5 |
| VTBN (10% VCN) | 45.0 | 0 | 0 | 0 | 0 |
| VTBN (16.5% VCN) | 0 | 45.0 | 45.8 | 40.4 | 32.3 |
| HPMA | 30.0 | 30.0 | 39.2 | 34.6 | 27.7 |
| IDP | 0 | 0 | 0 | 0 | 0 |
| DOM | 24.5 | 24.5 | 14.5 | 24.5 | 39.5 |
| IRG | 0.5 | 0.5 | 0.5 | 0.5 | 0.5 |
| VISC. POISE (27° C.) | 8.6 | 13.3 | 14.1 | 9.0 | 4.3 |
| DOSE, × 10⁵ RAD (4 MV EQUIPMENT) | 5.0 | 5.8 | 6.0 | 6.8 | 7.6 |
| PHYSICAL PROPERTY (25° C.) | | | | | |
| STRESS, PSI | 380 | 390 | 950 | 630 | 480 |
| STRAIN, % | 110 | 130 | 120 | 110 | 200 |

The results show that increasing the amount of plasticizer does diminish the stress strength of the binder system, but the stress strength is still sufficient. As expected, the material being more rubbery with the higher amount of plasticizer has better strain properties. The significant result in Table II is the large decrease in VISCOSITY, which is critical to injection-molding the energetic composition into explosive logic devices.

III. Compounding Energetic Compositions of Invention

Several 100-gram samples were prepared by different methods and with different loadings of pentaerythritol tetranitrate (PETN). Compounding started by mixing all organic ingredients and one fourth of the PETN in a Baker-Perkins high-shear mixer for thirty minutes. Examples 2 and 3 were mixed at 60° C. instead of 25° C. The other fourths of the PETN were added and mixing was continued for 30 minutes after the addition of each fourth. In Example 4, the mixture, which resembled small beads, was transferred to a 3-roll, pigment-dispersion mill, manufactured by the J. H. Day Co. The mixture was mixed for an additional 30 minutes and had the appearance and consistency of putty. Table III uses the same abbreviations as before and includes the following new abbreviations: B-P for Baker-Perkins high-shear mixer, RM for Roller Mill, B for damp powder, C for beads, and D for putty-like.

TABLE III

| | EXAMPLE NO. | | | |
|---|---|---|---|---|
| FORMULATION, WT. % | 1 | 2 | 3 | 4 |
| VTBN (16.5% VCN) | 6.46 | 7.11 | 8.07 | 6.46 |
| HPMA | 5.54 | 6.09 | 6.93 | 5.54 |
| DOM | 7.99 | 8.79 | 9.99 | 7.99 |
| IRG | 0.01 | 0.01 | 0.01 | 0.01 |
| LECITHIN | 0 | 0 | 0 | 0 |
| PETN, SUPERFINE | 80.00 | 78.00 | 75.00 | 80.00 |
| MIX TEMP, °C. | 25 | 60 | 60 | 25 |
| PROCESSING METHOD | B-P | B-P | B-P | RM |
| DESCRIPTION OF MIX | B | C | D | D |

The results demonstrate that the required putty texture for the energetic composition is obtained only by a very vigorous mixing procedure. Reducing the loading is not a viable solution because compositions with less than 79 weight percent of PETN are not usable.

IV. Evaluation of Detonation-Transfer Compositions

Uncured samples of Examples 3 and 4 of Experimental Section III were evaluated and compared to the presently certified composition which is designated as PBXN-301. Flow characteristics were tested by timing the flow of the samples through a 5.08 cm length tubing when a pressure of 300 psi is used to inject the material.

TABLE IV

| | FLOW CHAR., SEC | | DET. | CRIT. |
|---|---|---|---|---|
| EXPLOSIVE | DIA 1.02 MM | DIA 3.18 MM | VEL., MM/μSEC | DIAMETER MM |
| Ex. 3 | — | — | 6.7 | — |
| Ex. 4 | 125 | 45 | 6.9 | 0.51 |
| PBXN-301 | 17 | 20 | 7.2 | 0.13–0.25 |

The flow velocity of the subject composition is poorer than the presently used composition, but it is still well below the minimum guideline of 200 seconds/5.08 cm for a one millimeter channel. The additional advantages of the subject composition more than compensate for the slower time.

V. Additional Tests

A sample of Example 4 of Section III was cast into the gumstock mold of Section I and was irradiated with $1 \times 10^6$ rads of radiation as described in Section II. Close visual inspection of the cured material revealed no voids, thereby making a practical confirmation of radiation results of Section II. It is extremely important that no appreciable decomposition of PETN occur because voids would result in the explosive logic device. Due to the thinness of the channels in an explosive logic device, a very slight void could interrupt the continuity of the detonation-transfer material and cause the explosive logic device to fail.

Removing the cured sample from the mold was extremely difficult because of bonding between the material and the Lucite mold. The sample could not be removed without tearing. Another sample was cured in the mold but the mold was lined with a very smooth thin sheet of polyethylene. The cured material had adhered to the polyethylene liner. It was possible but difficult to separate the two materials without visibly damaging the cured material. Adhesion to the smooth Lucite and polyethylene demonstrates that free radicals are probably being generated during cure. The degree of bonding being found would add much strength to the cured material in an explosive logic device.

In summary, the subject energetic compositions have adequate flow and detonation characteristics. Besides the selection of the materials, the amount and the super fine grain size of the energetic filler and the large increase in the amount of plasticizer are important to the success of the subject compositions. The amount and particle size of the filler necessitate a new and extremely severe mixing procedure in order to compound the composition. The bonding between the cured subject composition and organic polymers (the typical construction material of explosive logic devices) greatly strengthens the cured material in an explosive logic device. Since the compositions do not need a catalyst to cure, the compositions would have an indefinite pot and shelf life, as well as an extremely consistent and reliable performance.

Many obvious modifications and embodiments of the specific invention, other than those set forth above, will readily come to mind to one skilled in the art having the benefit of the teachings presented in the foregoing description, and hence it is to be understood that such modifications are included within the scope of the appended claims.

What is claimed is:

1. An energetic composition which comprises, based on total composition weight,
from about 79 to about 84 weight percent of pentaerythritol tetranitrate having a particle size from about one to about four microns; and
from about 16 to about 21 weight percent of a binder system which comprises, based on total binder weight, from about 25 to about 60 weight percent of a vinyl-terminated polybutadiene-acrylonitrile copolymer represented by the formula

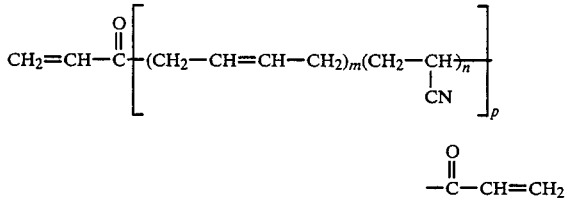

wherein m, n, and p have values such that the acrylonitrile content is from about 5 to about 20 percent, the vinyl equivalent weight is from about 1000 to about 1600, and the average molecular weight is from 2500 to about 5000; from about 25 to about 45 weight percent of a crosslinking monofunctional unsaturated ester selected from the group consisting of acrylates and methacrylates, and mixtures thereof, the amount of said ester being less than the amount of copolymer; from about 20 to about 50 weight percent of a plasticizer selected from the group consisting of dioctyl phthalate, maleate and adipate, isodecyl pelargonate, dibutyl phthalate and maleate and mixtures thereof; from about 0 to 1 weight percent of an antioxidant; and from about 0 to about one weight percent of a wetting agent.

2. The composition of claim 1 wherein said copolymer has an acrylonitrile content from 10 to 15 percent, the vinyl equivalent weight is from 1200 to 1900, and the average molecular weight is from 1200 to 1400.

3. The composition of claim 2 wherein the amount of said copolymer is from 30 to 45 weight percent.

4. The composition of claim 2 wherein the amount of said crosslinking ester is from about 25 to 35 weight percent.

5. The composition of claim 3 wherein the amount of said crosslinking ester is from 25 to 35 weight percent.

6. The composition of claim 4 wherein said crosslinking ester is selected from the class consisting of alkyl acrylates, methacrylates, hydroxyalkyl methacrylates, and mixtures thereof wherein the alkyl groups of said esters have from 1 to 4 carbon atoms.

7. The composition of claim 5 wherein said crosslinking ester is selected from the class consisting of alkyl acrylates, methacrylates, hydroxyalkyl methacrylates, and mixtures thereof wherein the alkyl groups of said esters have from 1 to 4 carbon atoms.

8. The composition of claim 2 wherein the amount of said plasticizer is from 25 to 40 weight percent.

9. The composition of claim 3 wherein the amount of said plasticizer is from 25 to 40 weight percent.

10. The composition of claim 4 wherein the amount of said plasticizer is from 25 to 40 weight percent.

11. The composition of claim 5 wherein the amount of said plasticizer is from 25 to 40 weight percent.

12. The composition of claim 10 wherein said crosslinking ester is selected from the group consisting of methyl acrylate and methacrylate, ethyl acrylate and methacrylate propyl acrylate and methacrylate, and mixtures thereof.

13. The composition of claim 11 wherein said crosslinking ester is selected from the group consisting of methyl acrylate and methacrylate, ethyl acrylate and methacrylate, propyl acrylate and methacrylate, and mixtures thereof.

14. The composition of claim 10 wherein said crosslinking ester is selected from the group consisting of hydroxy ethyl and hydroxy propyl methacrylate and mixtures thereof.

15. The composition of claim 11 wherein said crosslinking ester is selected from the group consisting of hydroxy ethyl and hydroxy propyl methacrylate and mixtures thereof.

16. The composition of claim 14 wherein said plasticizer is selected from the group consisting of dioctyl maleate and adipate and mixtures thereof.

17. The composition of claim 15 wherein said plasticizer is selected from the group consisting of dioctyl maleate and adipate and mixtures thereof, said anti-oxidant is hindered phenol, and said wetting agent is lecithin.

* * * * *